United States Patent [19]
Yoshida et al.

[11] 4,089,348
[45] May 16, 1978

[54] REED VALVE

[75] Inventors: Toshiro Yoshida; Katsujiro Sato, both of Toyota, Japan

[73] Assignee: Toyota Jidosha Kogyo Kabushiki Kaisha, Toyota, Japan

[21] Appl. No.: 702,237

[22] Filed: Jul. 2, 1976

[30] Foreign Application Priority Data

Apr. 6, 1976 Japan .................................. 51-37773

[51] Int. Cl.² ............................................. F16K 15/14
[52] U.S. Cl. .................................... 137/856; 251/139
[58] Field of Search ................................ 137/855–858; 251/139

[56] References Cited

U.S. PATENT DOCUMENTS

| 1,494,176 | 5/1924 | Little | 137/856 |
| 2,386,293 | 10/1945 | Clements | 137/858 |
| 2,476,320 | 7/1949 | Paulus | 137/856 |
| 2,782,777 | 2/1957 | Jasper | 137/856 X |
| 2,947,284 | 8/1960 | Nicholson | 251/139 X |
| 3,667,490 | 6/1972 | Allen | 251/139 X |
| 3,891,000 | 6/1975 | Melnick | 137/855 |
| 3,982,562 | 9/1976 | Pickett | 251/139 X |

*Primary Examiner*—Robert G. Nilson
*Attorney, Agent, or Firm*—Stevens, Davis, Miller & Mosher

[57] ABSTRACT

This application discloses a reed valve which comprises a means for keeping the reed sealingly seated on the valve seat.

1 Claim, 6 Drawing Figures

REED VALVE

BACKGROUND OF THE INVENTION

The present invention relates to a reed valve.

Generally, a reed valve contains a reed which is made from a resilient sheet and is secured to the valve body at its one end while its other end is free. The reed valve can be opened at this free end of the reed by the force resulting from the pressure difference between the upper and lower surfaces of the reed, and thus allow fluid to pass in one direction. Such reed valves are widely used in pipelines of various systems. In some systems, the reed valve is sometimes required to be kept closed for a long time. In such a case, a gate valve should be arranged adjacent to the reed valve in order to stop the fluid flow completely. Such an arrangement is disadvantageous spatially and economically. Another problem, due to the nature of the reed valve, is that the reed valve cannot operate reliably or with certainty as a check valve (one-way valve) because in the closed condition of the valve, the free end of the reed can be opened by the disturbance of the flow or by an unintentional parring of the valve.

SUMMARY OF THE INVENTION

An object of the present invention is to provide a reed valve in which the above drawbacks are obviated and the closed condition is reliably attained. The object is achieved by a reed valve which comprises a means for keeping the reed sealingly seated on the valve seat.

BRIEF DESCRIPTION OF THE DRAWINGS

The present invention will now be explained with reference to the accompanying drawings, in which.

Throughout all of the above drawings, like reference numerals designate like or corresponding parts.

DETAILED DESCRIPTION OF PREFERRED EMBODIMENTS

Figure 1:
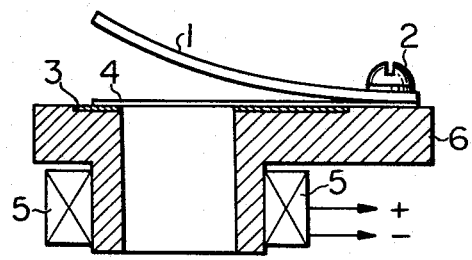
FIG. 1 through FIG. 6 show the preferable embodiments of the invention, respectively.

FIG. 1 shows a first embodiment in which an electromagnet is used as the means for keeping the reed sealingly seated on the valve seat. A sheet of reed 4 and a stopper 1 for the reed 4 are secured together to a valve body 6 at one of their ends by a screw 2. In FIG. 1, the reed valve is closed and the reed 4 sealingly covers a valve seat 3 which is made of a sealing material. An electromagnet solenoid 5 is arranged on an underside of the valve body 6. The solenoid 5 is connected to a direct current source (not shown). The reed 4 and the valve body 6 are made of magnetic material.

In use, when the solenoid 5 is energized, a magnetic force is generated in the valve body 6, which attracts the reed 4 with the result that the reed 4 securely seats itself on the valve seat 3. In this way, the reed valve is kept closed with certainty. When the solenoid 5 is deenergized, the magnetic force which attracts the reed 4 disappears. Then, the reed valve operates as a generally known reed valve.

Figure 2:
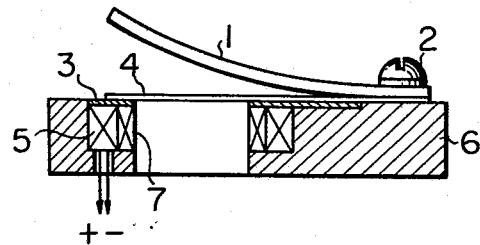

In a second embodiment shown in FIG. 2, said means for keeping the reed closed is an electromagnet which comprises a core ring 7 made of magnetic material and a solenoid 5 arranged around said core ring 7. The entire electromagnet is buried in the valve body 6. The reed 4 is made of magnetic material, but the valve body 6 is not necessarily made of magnetic material. This reed valve operates in the same manner as described above for the first embodiment.

Figure 3:
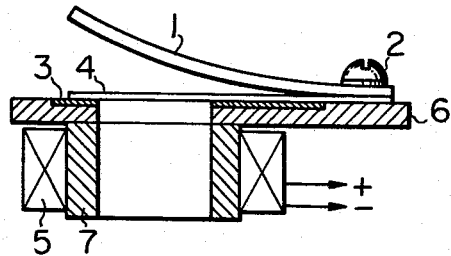

In FIG. 3, a third embodiment is shown. In this case, substantially the same electromagnet as used in the second embodiment is arranged on an underside of the valve body 6.

Figure 4:
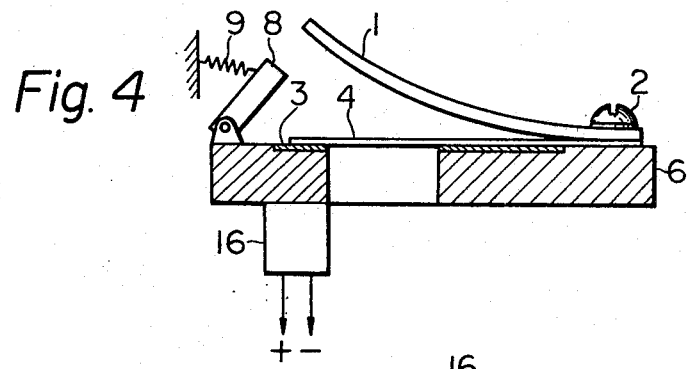

In a fourth embodiment shown in FIG. 4, said means for keeping the reed closed comprises a holding member 8 and an electromagnet 16. The holding member 8 is made of magnetic material and is pivotally mounted on the valve body 6 at its one end while its other end is connected to a spring 9 which is secured to a stationary wall. The electromagnet 16 is mounted under this holding member 8 on the underside of the valve body 6.

When the electromagnet 16 is energized, the holding member 8 is attracted to the electromagnet and pivotally rotates clockwise against the force of the spring 9. Thus, the holding member 8 holds the reed 4 down on the valve seat 3. When the electromagnet 16 is deenergized, the holding member 8 is forced away from the valve seat 3 by the spring 9. Accordingly, the end of the reed 4 can move freely, operating in the same manner as the generally known reed valve.

Figure 5:
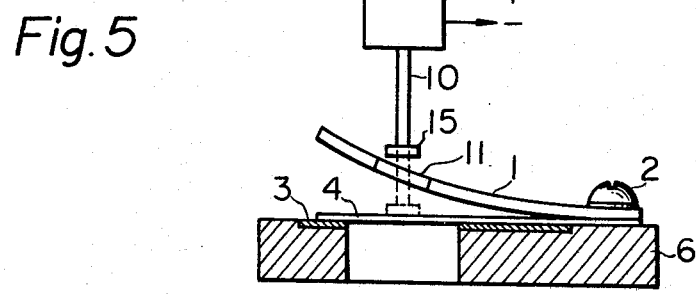

In a fifth embodiment shown in FIG. 5, said means for keeping the reed closed comprises an electromagnet 16 and a rod 10 which cooperates with the electromagnet 16. A holding plate 15 is arranged at the end of the rod 10. The stopper 1 has a hole 11 for the rod 10 to pass through. When the electromagnet 16 is energized, the rod 10 moves downward so that the plate 15 holds the reed 4 down on the valve seat 3.

Figure 6:
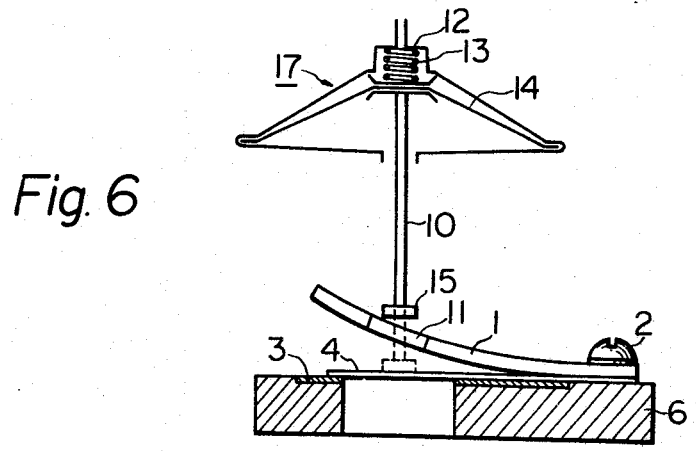

FIG. 6 shows a sixth embodiment. In this embodiment, a diaphragm device 17 is used instead of the electromagnet 16 which is used in the fifth embodiment. The diaphragm device 17 comprises a diaphragm chamber 12, a spring 13 for adjusting the operating pressure and a diaphragm 14. The chamber 12 communicates with a pressure source (not shown).

When the pressure from the source increases, the diaphragm 14 is depressed, and thereby the rod 10, which is connected to the diaphragm 14, is moved downward. Thus, the reed 4 is held down on the valve seat 3 by the holding plate 15. On the other hand, when the pressure from the source decreases, the diaphragm 14 is drawn up, and thereby the rod 10 is moved upward. When the rod 10 is moved upward the reed 4 can move freely so that this reed valve operates in the same way as the generally known reed valve.

As will be understood from the above described embodiments, the reed valve according to the invention can be closed with certainty at desired moment and kept closed without danger of leakage due to an unintentionally opened gap between the reed and the valve seat.

It should be understood that the invention is not limited to the above described embodiments, but may be modified therefrom within the spirit and scope of the accompanying claims.

What is claimed is:

1. A reed valve comprising:
   a valve body having a passage for gas;
   a valve seat made of sealing material arranged on the upper surface of said valve body;
   a hollow projection aligned with said passage, located on the underside of said valve body and made of magnetic material;
   a reed made of resilient magnetic material with one end secured to said valve body by a screw while the other end is freely movable, the reed being arranged on said valve seat to close by its own resilience said passage when the pressure difference between the upper side and the lower side thereof is small;

a stopper for said reed arranged over said reed and secured to said valve body by said screw; and a solenoid arranged around said projection for magnetizing said reed, so as to close the valve with certainty and prevent undesirable and unintentional opening of the valve.

* * * * *